Feb. 3, 1942.   J. W. LEWIN   2,271,798
UNDERFLOOR WIRING SYSTEM
Original Filed Oct. 7, 1937
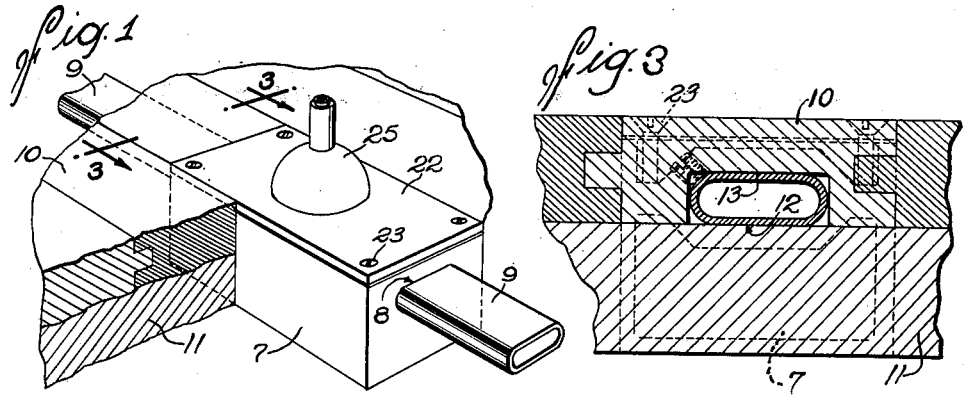
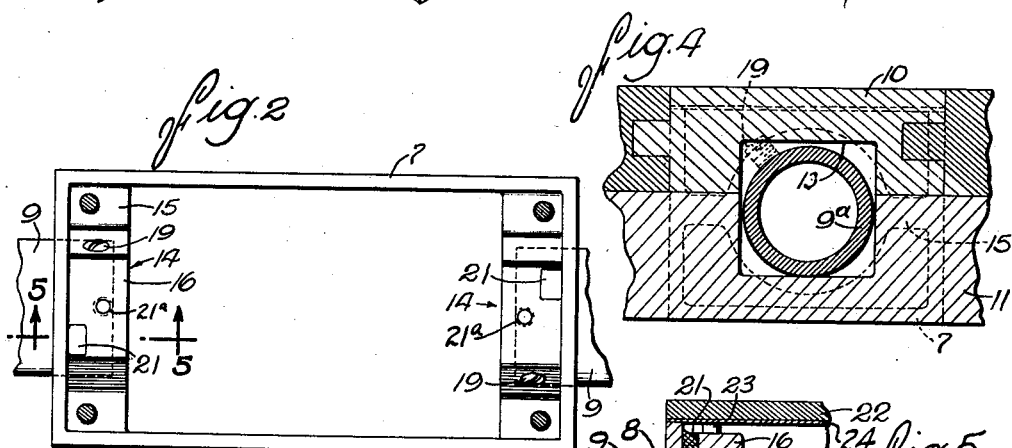
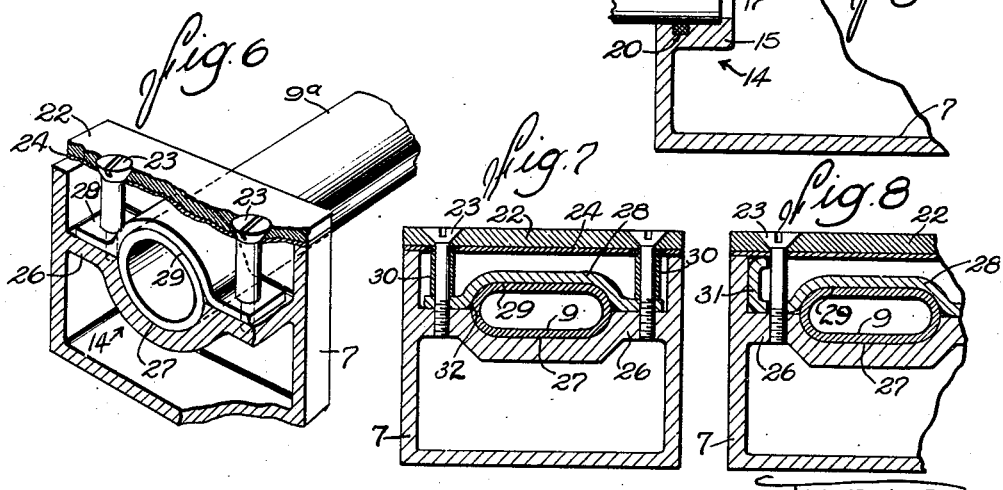
INVENTOR
Jacob W. Lewin
By Parker, Carlson, Pitzner & Hubbard
ATTORNEYS Patented Feb. 3, 1942

2,271,798

UNITED STATES PATENT OFFICE 2,271,798

UNDERFLOOR WIRING SYSTEM

Jacob W. Lewin, Chicago, Ill.

Continuation of application Serial No. 167,681, filed October 7, 1937. This application October 10, 1940, Serial No. 360,612

1 Claim. (Cl. 72—16)

The invention relates to improvements in outlet or junction boxes of the type generally employed in electric wiring installations and more particularly to a box adapted for floor installation.

The present application is a continuation of my copending application, Serial No. 167,681, filed October 7, 1937, and is directed particularly to the combination of a substantially conventional type of flooring with a floor box so constructed and arranged that the conduits leading to and from the box may be arranged to be received within the top floor board whereby the floor box can be placed flush with the floor surface, while the conduit can be extended along the top of the sub-flooring extending within a suitable channel or recess formed in the under-surface of the top floor board.

One object of the invention is to effect improvements in the construction of floor boxes of the above general character whereby a box and its associated wiring fixtures may be installed without materially weakening the floor supporting structure.

Another object is to provide a novel floor box adapted for quicker and more economical installation.

A further object is to provide a floor box embodying novel means by which the conduits entering the box may be rigidly secured thereto and which provides for effectively sealing the box against the entrance of moisture around the conduits.

With the foregoing and other objects in view, the invention resides in the construction and novel combination and arrangement of the parts hereinafter fully described and illustrated in the accompanying drawing, it being understood that various changes in the form, proportions and details of construction may be made by those skilled in the art without departing from the spirit and scope of the invention as expressed in the appended claim.

Referring to the drawing:

Fig. 1 is a perspective view of a floor box embodying the features of the invention, showing the box installed in one type of floor structure.

Fig. 2 is a plan view of the box with the cover removed.

Fig. 3 is a sectional view taken along the line 3—3 of Fig. 1, showing the relative positioning of the box and the associated wiring fixtures with respect to the floor structure. Fig. 4 is a sectional view taken along the same line as Fig. 3, showing a modified form of the floor box.

Fig. 5 is a sectional view taken along the line 5—5 of Fig. 2, showing details of the conduit clamping means.

Figs. 6, 7 and 8 are sectional views of the floor box utilizing modified forms of conduit clamping means.

The floor box selected to illustrate the invention comprises generally an open topped, rectangular casing 7 of cast iron or other suitable material having openings 8 in each end wall for the reception of conduits 9 through which the electrical conductors enter and leave the box. The rectangular form of the box makes it particularly suitable for installation in floor structures having a wearing surface consisting of conventional tongued and grooved floor boards 10 supported on a subfloor 11 of wood, concrete or other material commonly used for this purpose.

To facilitate installation of the box, the width of the casing is preferably made to correspond exactly with the width of a floor board 10. Thus, only one board need be cut to provide a recess for the reception of the box, and since the box presents a square end, the cut may be taken squarely across the board. Further, the casing 7 is of just sufficient depth to accommodate the fittings to be installed therein, thereby enabling it to fit into a relatively shallow cavity or recess in the subfloor 11.

Installation is further facilitated and weakening of the subfloor is avoided by the advantageous positioning of the conduit openings 8. In the preferred form of the box illustrated in Figs. 1 to 3, the openings 8 are suitably shaped for the reception of non-circular conduit such as that commonly known as "Ovalduct," and are so positioned that the lower edge 12 of the opening will lie in substantially the same plane as the surface of the subfloor 11 when the box is installed as shown in Fig. 3. With this arrangement of the openings, the Ovalduct may be laid directly on the subfloor and the overlying floor board grooved, as indicated at 13, to provide a suitable channel for the Ovalduct. Thus the groove or slot heretofore required in the subfloor is dispensed with and the attendant weakening of the floor supporting structure is effectually avoided.

The location of the Ovalduct above the surface of the subfloor is also advantageous from the standpoint of installation, as it is a simple matter to form a suitable groove or channel in the floor board to accommodate the Ovalduct. For this purpose, the floor board may be taken up and the grooving performed on a routing or other suitable machine which results in substantial economies in the cost of installation. Moreover, by reason of its small depth, the casing may be received in a relatively shallow recess in the subfloor which can be formed therein with a minimum of labor.

Disposed entirely within the casing 7 at each conduit opening 8 is a conduit clamping structure 14 of novel construction. In the preferred form shown in Figs. 2 and 5 of the drawing, the clamping structure 14 comprises a web 15 extending transversely across the end of the casing and having an enlarged central portion 16 in which is formed a longitudinal passage 17 registering with the opening 8 for the reception of the conduit. A shoulder 18 around the inner end of the passage is adapted to engage the end of the conduit and limit the inward movement of the same. A set screw 19 threaded into the web at one side of the passage 17 serves to clamp the conduit to the casing. The set screw 19 also serves to provide an electrical bond between the casing 7 and the conduit 9.

Novel means is embodied in the conduit clamping structure for providing a water-tight seal around the conduit. For this purpose, an annular channel 20 is formed around the inside wall of the passage 17 adjacent the end wall of the casing 7, which passage is provided with an upwardly opening vent 21. When the conduit is in place, a sealing compound may be introduced into the channel through the vent 21. Any suitable compound may be used for this purpose, such as iron cement or certain asphaltic compounds which liquefy when heated and solidify on cooling. The sealing thus provided effectively prevents entrance of moisture into the box around the conduit and additionally serves to anchor the conduit securely to the box. If iron cement is used, it serves to increase the electrical bond between the casing and conduit.

Any conventional switch, outlet or other fixture may be mounted in the improved box, such fixture being supported on the enlarged portion 16 of the web at each end of the casing. Threaded holes 21a for the fixture screws are provided in the portion 16 as shown in Fig. 2.

The improved floor box may be modified for use with an ordinary cylindrical conduit 9a by suitably shaping the conduit openings 8 and clamping structure 14. As such conduit cannot be accommodated entirely within the groove 13 formed in a floor board, grooving of the subfloor is necessary. In this case, the conduit opening is positioned so that a substantial portion of the conduit projects above the surface of the subfloor. Thus the groove in the subfloor may be of minimum depth, as shown in Fig. 4.

The outlet box constructed in accordance with either form above described is provided with a suitable cover 22 arranged to be secured to the box as by screws 23 threading into the web 15 as indicated in Fig. 2. A gasket 24 of cork or the like may be interposed between the upper edge of the casing and the cover to provide an effective seal against the entrance of moisture. As will be seen by reference to Fig. 1, the various parts of the box are so proportioned so that the upper surface of the cover is flush with the surface of the floor. The cover, of course, may be formed with a suitable opening for the reception of a plug 25 or other connection of standard construction.

In the modified forms shown in Figs. 6, 7 and 8, the conduit clamping structure comprises a clamping member in the form of a transverse web 26 formed integrally with the casing 7 and having a suitably shaped, upwardly opening channel 27 in its upper surface for the reception of the conduit. The channel preferably conforms closely to the contour of the conduit to be received in the box, that is, a semi-cylindrical channel is provided for a cylindrical conduit as shown in Fig. 6, and for Ovalduct the channel is formed as shown in Fig. 7. Cooperating with the web 26 is a second clamping member 28 having a corresponding channel 29 adapted to fit over the upper portion of the conduit to clamp the conduit against the member 26. The member 28 may be secured in place in any suitable manner. As shown in Fig. 6, for example, the screws 23 which hold the cover 22 in place are formed with shoulders adapted to bear against the clamping member. Alternatively, the screws employed for this purpose may be of the ordinary type and carry suitable metal sleeves 30 interposed between the cover and the clamping member as shown in Fig. 7. In a third form shown in Fig. 8, the member 28 is formed at each end with an upwardly bent portion 31 adapted to bear against the underside of the cover plate 22 when the plate is secured to the box.

In the above forms of clamping structure, the conduit opening may be sealed by interposing a suitable bushing, such as a strip of soft metal, between the conduit and the clamping members. Thus, when the members are clamped together tightly, the metal of the bushing will be forced into the gap between the members as indicated at 32 (Fig. 7) to form a water-tight seal around the conduit, and also will provide an electrical bond between the casing and the conduit.

It will be apparent from the foregoing that the invention provides a floor box of novel form and construction. By reason of the advantageous positioning of the conduit openings, the box and associated fixtures may be installed in a floor structure without materially weakening the supporting structure. Moreover, the shape and proportions of the casing of the improved floor box greatly facilitates installation. The box further embodies novel conduit clamping structure which permits the conduit to be rigidly secured thereto and provides a water-tight seal effective to exclude moisture from the box. Such clamping structure is located entirely within the casing so that the exterior of the casing is composed of flat surfaces readily matching the floor structure.

I claim:

In an underfloor wiring system for a floor structure, a rectangular metal outlet box having transverse planar end walls, a tubular conduit extending out of one of said end walls adjacent to but spaced below the upper edge thereof, a solid sub-floor, a top floor laid directly on said sub-floor and comprising conventional tongue and groove boards, one of said boards having a longitudinal section omitted of a length equal to that of said box, said box being of the same width as said board, said sub-floor having a recess therein for receiving the lower portion of said box with said conduit supported on the top of said sub-floor and said box having its surface flush with said top floor and opposite walls in abutment with the ends of said section, said board having a longitudinally extending recess in the undersurface thereof accommodating said conduit therein.

JACOB W. LEWIN.